United States Patent [19]
Abiven

[11] Patent Number: 5,363,370
[45] Date of Patent: Nov. 8, 1994

[54] MULTIRATE DIGITAL MULTIPLEXING DEMULTIPLEXING METHOD AND DEVICE

[75] Inventor: Jacques Abiven, Plouaret, France

[73] Assignee: France Telecom, Paris, France

[21] Appl. No.: 181,976

[22] Filed: Jan. 18, 1994

Related U.S. Application Data

[63] Continuation of Ser. No. 786,763, Nov. 1, 1991, abandoned.

[30] Foreign Application Priority Data

Nov. 9, 1990 [FR] France ................. 90 13923

[51] Int. Cl.$^5$ ............................................. H04J 3/22
[52] U.S. Cl. ......................................... 370/84; 370/112
[58] Field of Search ............... 370/84, 112, 118, 79, 370/85.7, 99

[56] References Cited

U.S. PATENT DOCUMENTS

| | | | |
|---|---|---|---|
| 4,790,015 | 12/1988 | Callens et al. | 375/122 |
| 4,893,306 | 1/1990 | Chao et al. | 370/84 |
| 5,005,170 | 4/1991 | Nelson | 370/112 |

*Primary Examiner*—Douglas W. Olms
*Assistant Examiner*—Min Jung
*Attorney, Agent, or Firm*—Laubscher & Laubscher

[57] ABSTRACT

The method is intended for implementation in a central station connected to digital channels having different primary rates and servicing terminal stations matched at different on-line rates respectively higher than the primary rates via a one single duplex or half-duplex communications network. The network carries a multirate frame divided into sectors having on-line rates corresponding to terminal stations communicating with the main station.

19 Claims, 6 Drawing Sheets

FIG. 2 MULTIPLEXING AND TRANSMITTING CENTRAL STATION

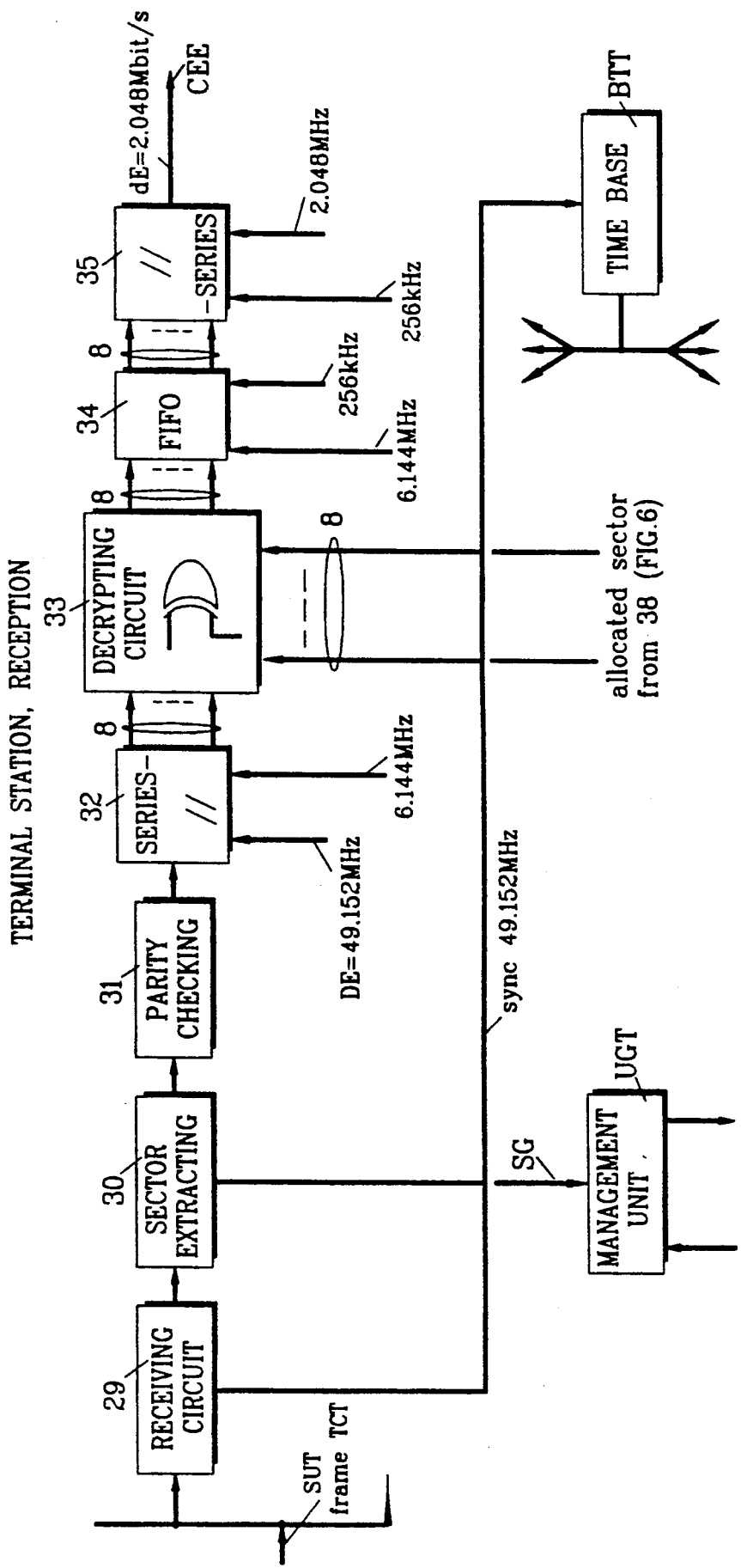

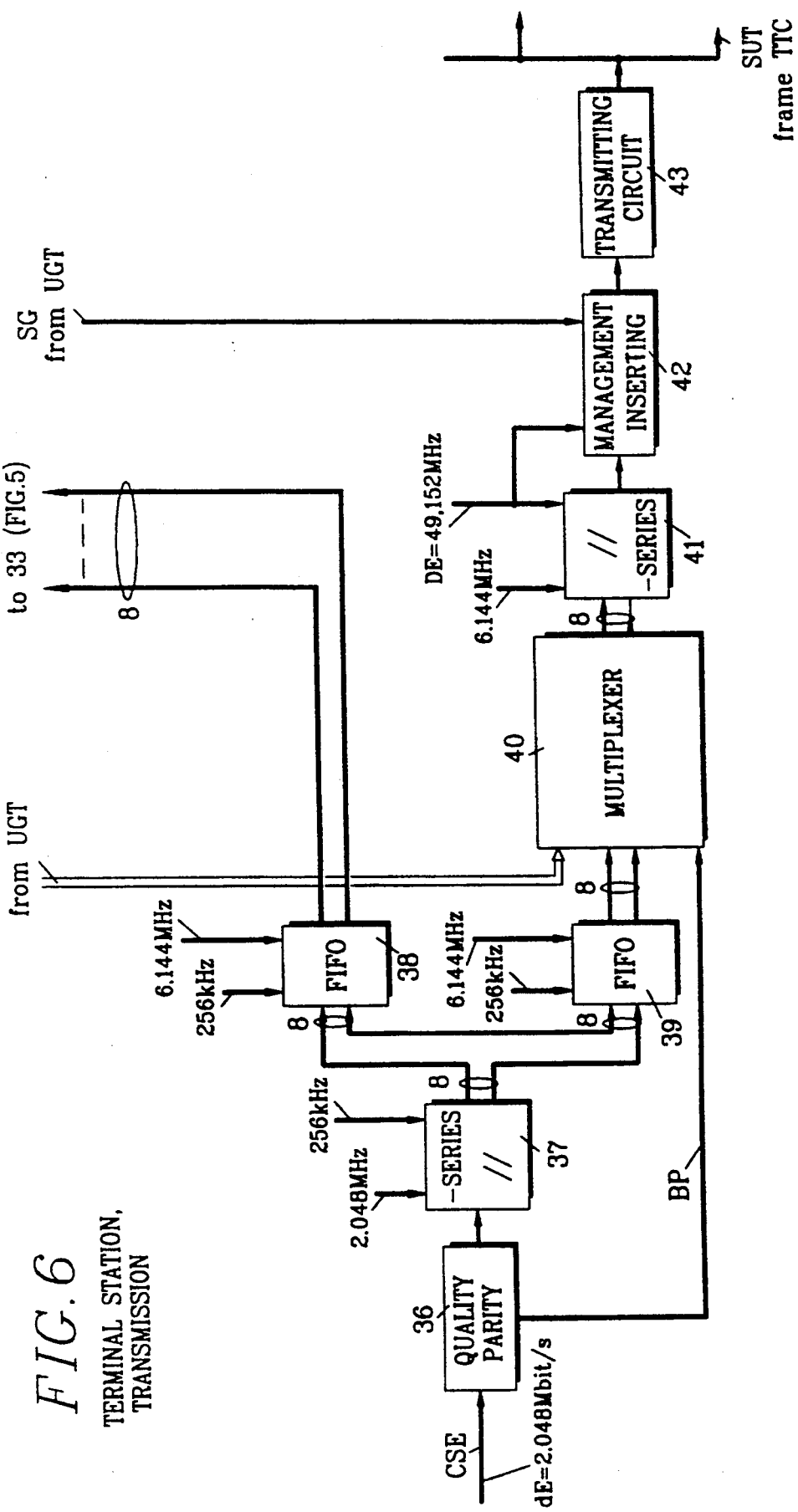

MULTIRATE DIGITAL MULTIPLEXING DEMULTIPLEXING METHOD AND DEVICE

This application is a continuation of U.S. patent application Ser. No. 07/786,763, filed Nov. 1, 1991, now abandoned.

BACKGROUND OF THE INVENTION

1. Field of the Invention

This invention relates to a method and apparatus for the multiplexing of plural parallel digital channels having different primary rates into a digital frame having predetermined duration and period, and reciprocally, to a corresponding demultiplexing, method and apparatus.

2. Description of the Prior Art

To multiplex such digital channels in the current state of the art, the latter are multiplexed bit by bit or byte by byte, or word by word of a given number of bits, into a frame having a predetermined high bit rate that is greater than the highest common multiple of the primary bit rates. The rate is constant throughout the frame. The frame is only divided into sectors for frame management purposes, in order to insert management data at regular intervals, notably concerning the quality of transmission of the frame and data concerning the state of at least one digital channel.

Irrespective of the primary rate of a terminal station receiving such a frame produced by a central station servicing plural terminal stations, the terminal station must be matched for transmission and reception to the sole on-line high rate of the frame. The terminal station must comprise a frame demultiplexer in order to reach the hierarchical level of the digital channels and to extract the respective digital channel.

Another solution for distributing digital channels with different rates from a central station is to physically distinguish transmission means intermediary between the stations as a function of the rate of the channels. In this case, a star transmission network with an on-line rate corresponding to the channel rate is associated with each group of terminal stations connected to digital channels having the same rate. When a new terminal station rate becomes available, a new network must be created.

OBJECT OF THE INVENTION

The main object of this invention is to remedy the preceding disadvantages by constituting a multirate frame, i.e., one single frame in which various on-line rates, also called modulation speeds, associated with different types of terminal stations, co-exist and are transmitted through a single network between the central station and the terminal stations. Conversely, it is emphasized that according to the prior art, a frame obtained by time-division multiplexing of primary source data with different low rates has only one single constant binary rate, i.e., all the bits in the frame have the same width irrespective of the primary source rate from which they come.

SUMMARY OF THE INVENTION

Accordingly, there is provided a method for multiplexing a plurality of parallel digital channels having primary rates which are different therebetween into a digital frame having predetermined duration and period. The frame comprises sectors of predetermined duration to which are allocated digital channels from among the plurality of the channels. The on-line rates in the sectors are greater than the primary rates of the allocated channels respectively, the on-line rates being different and sub-multiples of a higher on-line rate.

According to a preferred embodiment, the method consists essentially in the formation of a given frame in accordance with the following steps:

memorizing bits of the channels during a frame period preceding the given frame respectively at the primary rates in order to constitute parallel memorized groups of serialized channel bits, parallel reading the groups of channel bits at on-line rates respectively corresponding to the primary rates of the channels throughout the duration of each of the sectors in the given frame, thereby repeating each of the bit groups as many times as there are sectors in the frame, allocating digital channels from among the plurality of the digital channels to the sectors of the given frame respectively, and selecting one of the repeated parallel groups of bits from each of the allocated channels throughout the duration of the respective sector thereby multiplexing selected groups of bits in the given frame including one selecting bit group per sector.

This method is equally applicable for duplex mode transmission and half-duplex mode transmission, in which the duration of a frame is less than the half-period of the frame.

The invention also relates to a multiplexing device to carrying out the aforesaid multiplexing method. The multiplexing device comprises:

plural means for memorizing bits of the channels in parallel respectively, plural means for writing parallel groups of bits of the channels respectively in the memorizing means at the primary rates during each frame period, plural means for reading the bit groups in the memorizing means at on-line rates respectively corresponding to the primary rates of the channels throughout the duration of each of the sectors of a frame thereby repeating each of the bit groups as many times as there are sectors in the frame, means for memorizing addresses of digital channels allocated respectively to the frame sectors from among the plurality of channels, means for reading the allocated channel addresses in correspondence with the durations of the respective sectors in the frame, and means for multiplexing groups of bits respectively read in response to the allocated channel addresses and throughout the frame sector durations.

Reciprocally, the invention relates to a method for demultiplexing digital channels from a given frame with sectors similar to the ones obtained in accordance with the multiplexing method embodying the invention, and to a multiplexing device to carry out the demultiplexing method.

The demultiplexing method therein comprises the following steps :

memorizing channel bits respectively included in the sectors of the frame and at the highest on-line rate, reading serialized bit groups respectively associated with ranks of the bits in all the sectors, the ranks being defined with respect to the bits in a sector having the highest on-line rate, each of the groups comprising bits located at a same rank respectively in the sectors, and the reading of the groups being carried out at the highest primary rate thereby deriving a multiplex signal where the sectors are multiplexed bit by bit during a frame period, and cyclical switching the bits of the multiplex signal respectively towards the digital channels allocated to the sectors.

The demultiplexing device comprises:

means for converting serialized channel bits in each of the sectors of the frame into successive groups of NB parallel channel bits, where the number of bits NB is a sub-multiple of the number of channel sectors NS in the frame, means for memorizing the NB-parallel-bit groups during a frame period, means for writing the NB-parallel-bit groups in the memorizing means at a rate which is a sub-multiple of the highest on-line rate in the frame sectors with regard to the bit number NB, means for reading the NB-parallel-bit groups in the memorizing means at a rate which is a multiple of the highest primary channel rate with regard to the sector number NS, the reading of the groups being carried out in such a way that NS NB-parallel-bit groups containing bits located at NB same ranks respectively in the NS frame sectors are read successively at the multiple rate to form a set of NS groups, the ranks being defined with respect to the bits in a sector having the highest in-line rate, and each of the NS-group sets is successively read NB times at the highest primary rate, means for successively selecting NB series each having NS consecutive bits in NB identical sets read successively, a series comprising bits of identical rank in the sectors, and the series being selected by ascending order of the ranks of the bits in the sectors thereby deriving a multiplex signal where the sectors are multiplexed bit by bit during a frame period, and means for switching the bits of the multiplex signal towards the digital channels as a function of the correspondence between addresses of the frame sectors and addresses of the channels.

There is also provided a central station in a communication network connected to digital incoming and outgoing channels having different primary rates, for two-way servicing plural terminal stations that communicate with the central station via a multirate tree-structured communication medium. The terminal stations are matched to on-line rates respectively associated with and higher than the primary rates. The central station comprises a multiplexing device and a demultiplexing device as defined hereinabove according to the invention.

Under these conditions, a terminal station that is connected to one of two-way digital channel pairs having one of the primary rates associated to one of the predetermined on-line rates comprises means for extracting the respective sector at the associated on-line rate from the first frames leaving the central station, means for converting the extracted sector into a group of bits at the associated primary rate of the respective incoming channel, means for converting groups of bits at the associated primary rate from the respective outgoing channel into the respective second-frame sectors at the associated on-line rate, and means for introducing the outgoing channel sectors into the second frames entering the central station.

BRIEF DESCRIPTION OF THE DRAWINGS

Further advantages and features of the invention will be more apparent from the following description of several preferred embodiments of the invention as illustrated in the corresponding accompanying drawings in which:

FIG. 5 is a schematic block diagram of receiving means of a terminal station embodying the invention and associated with a maximum on-line rate; and FIG. 6 is a schematic block diagram of transmitting means in the terminal station associated with the maximum on-line rate.

DESCRIPTION OF THE PREFERRED EMBODIMENTS

Figure 1:
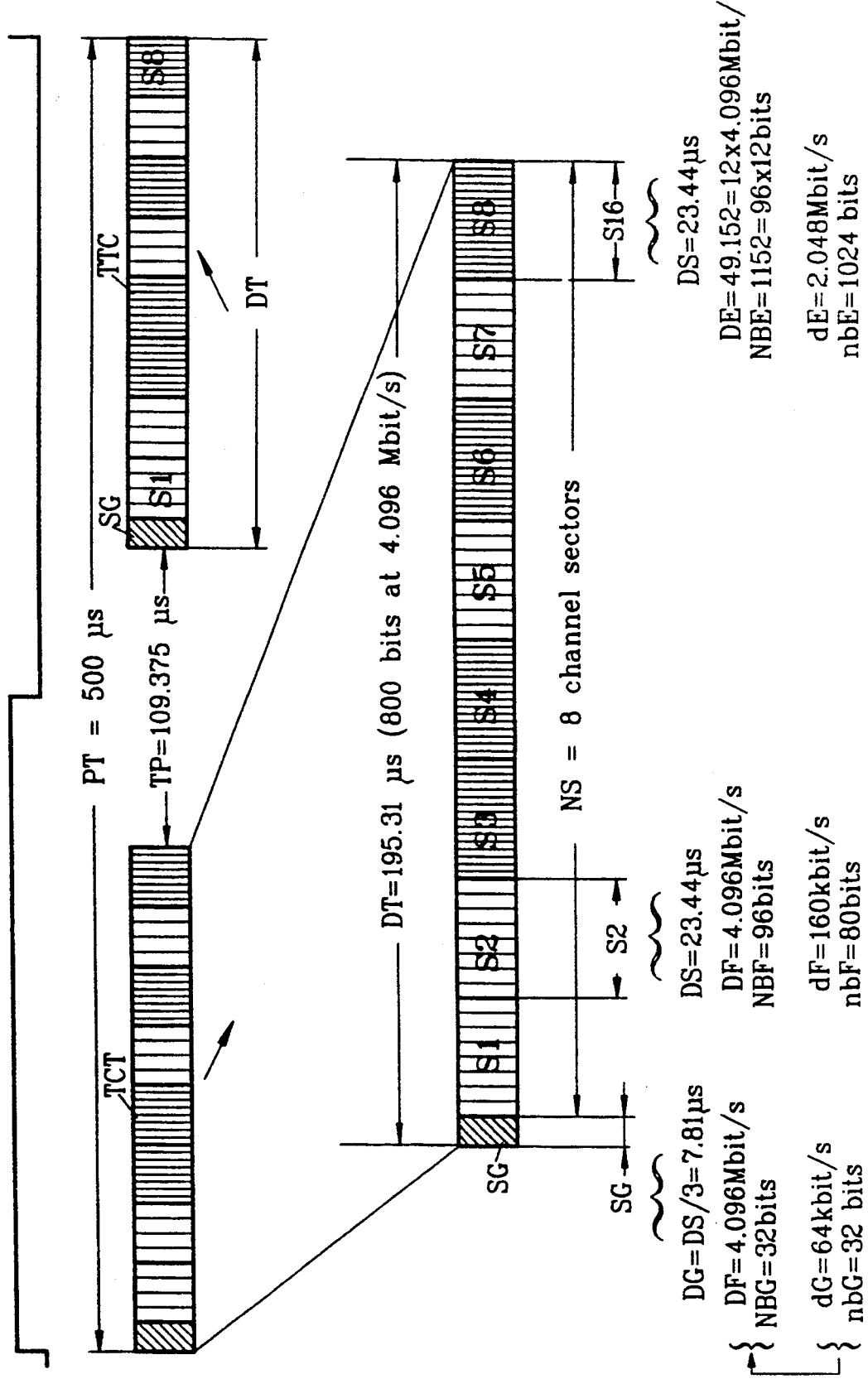
FIG. 1 shows details of a multirate frame embodying the invention with regard to a frame period and to the various sectors comprising it.

Numerical values notably of durations, bit rates, frequencies and numbers of bits are hereinafter indicated as unrestrictive examples for the purposes of constituting a multirate digital frame TCT embodying the invention, as shown in FIG. 1.

The frame TCT has a period PT = 500 $\mu$s corresponding to a frequency of 2 kHz, and a duration DT = 195.31 $\mu$s, in this instance well below the period PT. The duration DT may be defined as corresponding to a transmission of 800 bits at a constant rate DF = 4,096 Mbit/s which is the lowest on-line rate in the sectors of the frame.

The frame TCT is comprised of a management sector SG in the heading of the frame, and of NS = 8 digital channel sectors S1 to S8.

The management sector SG comprises a frame alignment word MVT intended to synchronize time bases in the terminal stations which are serviced via a tree-structured transmission medium SUT, e.g. an optical fiber medium, by a central station which includes a multiplexing device forming the frame TCT. The terminal stations have reception/transmission rates DE, DF which are different to one another. The management sector also comprises words exchanged between the central station and one of the terminal stations in accordance with a given protocol, e.g. for the putting into operation and attribution of one of the channel sectors to this terminal station, or the setting of the transmission amplitude level of the transmitting circuit in the terminal station. Other management words, notably concerning the parity of the frame sectors, the numbers and rates of the sectors in relation to the addresses of the terminal stations, and alarms for maintenance of the stations, are included in the sector SG.

The bits of the management sector SG are processed in the stations at the primary rate dG = 64 kbits/s and therefore number nbG = 64×0.5 = 32 for PT = 500 $\mu$s. By imposing an on-line rate DG in the sector SG equal to the lowest rate DF = 4,096 Mbit/s in the channel sectors in order for the management sector to be interpretable by all the terminal stations, the duration of the management sector is DG=7.81 μs, i.e., one third of the duration DS=23.44 μs in each of the channel sectors.

According to the embodiment envisioned here, the 5 digital channels have one of the two primary rates dF=160 kbits/s and dE=2,048 Mbit/s.

In other embodiments, the number of different primary rates and consequently the number of on-line rates in the sectors can be higher, or even equal to the number of sectors NS=8. The on-line sector rates are submultiples of the highest on-line sector rate DE=49.152 Mbit/s and can be e.g. 4,096 Mbit/s; 8,192 Mbit/s; 12.288 Mbit/s; 16,384 Mbit/s and 24.576 Mbit/s.

The digital channels at the rates dF and dE are thus divided into groups of nbF=160×0.5=80 bits and nbE=2048×0.5=1024 bits at each frame period PT. A group of bits at the low primary channel rate dF is packed into a sector, such as sector S2 in FIG. 1, in order to be transmitted at the low on-line sector rate DF=4,096 Mbit/s; this sector then comprises NBF=(DF.DS)=96 bits which include nbF=80 channel data bits. Similarly, a group of bits at the high primary channel rate dE is packed into a sector, such as sector S8 in FIG. 1, in order to be transmitted at the high on-line sector rate DE=49,152 Mbit/s; this sector comprises NBE=(DE.DS)=1152 bits which include nbE=1024 channel data bits. The additional bits in the sectors, which respectively number NBF−nbF=16 and NBE−nbE=128, are filling bits of no significance whatsoever, or are preferably used partially for maintenance purposes, and are located at the end of the sectors.

It should be noted that the on-line sector rates which are determined as a function of the operating features of the various types of terminal station are preferably multiples of the low on-line sector rate DF, and more precisely of the on-line rate DG of the management sector in order to enable processing of the management sector by all the terminal stations. In this example, a bit at the low sector rate DF is equivalent to DE/DF=12 successive bits in the same logic state and at the rate DE, i.e., the width of a bit at the low sector rate DF is 12 times greater than the width of a bit at the high sector rate DE in the frame.

In practice, several central stations embodying the invention are included in a telephone switching center linked up to the switched telephone network, and each central station services several terminal stations via a respective tree-structured transmission medium. Usually, at least NS=8 digital channels for each of the planned primary rates dF, . . . , dE are connected to ports of the central station to enable, depending on various types of terminal station in greater or lower number than NS, a frame to contain NS=8 sectors with identical on-line rates, or with different respective rates, or according to various combinations of rates as a function of requests from the terminal stations for access to the network. According to the embodiment described, e.g. NS=8 incoming digital channels CEF1 to CEF8 are planned at the low primary rate dF=160 kbit/s as well as NS=8 incoming digital channels CEE1 to CEE8 are planned at the high primary rate dE=2,048 Mbit/s.

Figure 2:
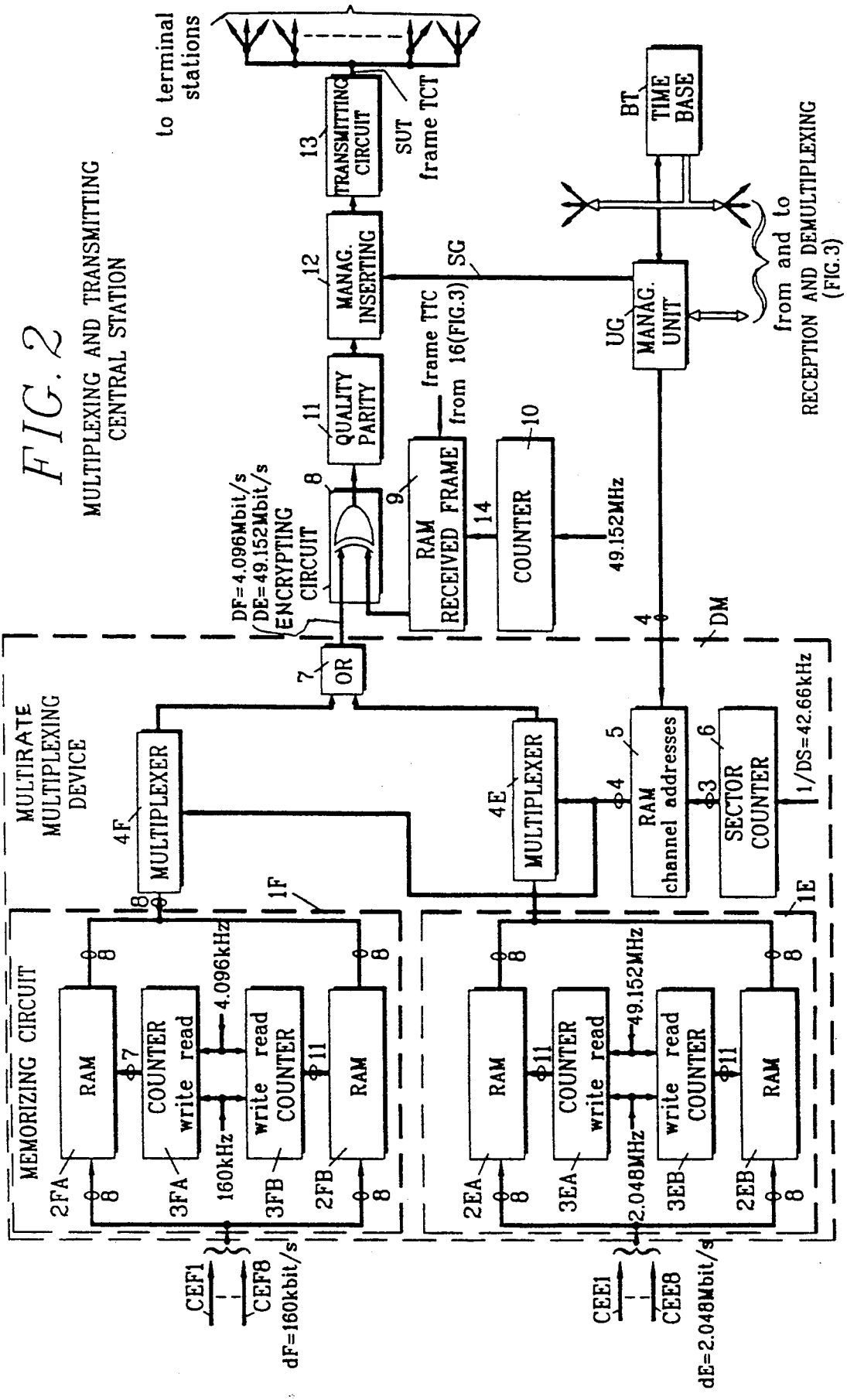
FIG. 2 is a schematic block diagram of multirate multiplexing and transmitting means included in a central station incorporating the multiplexing and demultiplexing methods and devices of the invention.

As shown in FIG. 2, multiplexing and transmitting means in the central station comprise a multirate multiplexing device DM, and frame transmitting means. A time base BT and a communications management unit UG are common to both the multiplexing and transmitting means and receiving and demultiplexing means included in the central station and respectively shown in FIGS. 2 and 3.

As regards synchronization, the time base BT serves as master clock to the slave time bases in the terminal stations. From the 49,152 MHz frequency corresponding to the high on-line rate, the time base BT supplies all the clock signals required for the multiplexing/demultiplexing and frame transmission/reception operations, for which the frequencies are indicated hereinafter.

The management unit UG manages the communications and particularly the synchronization of the transmitting means in the terminal stations as a function of their distance from the central station in order to avoid all overlapping of the sectors in the frame TTC received by the central station, and remote-controls setting of the power of said transmitting means in the terminal stations in order for the receiving means in the terminal stations in the central station to receive digital signals of the same level of amplitude irrespective of the distances from the terminal stations to the central station. This management is notably ensured via bits in the management sector SG of the frames in both transmission directions. From the point of view of communications, the management unit UG derives the number of terminal stations in operation, attributes a sector to each terminal station in operation, and associates each sector with the channel requested by the terminal station and therefore with the rate requested.

The multiplexing device DM shown in FIG. 2 comprises as many memorizing circuits 1F, 1E as there are different primary rates dF, dE, i.e., different on-line rates DF, DE.

In each memorizing circuit 1F, 1E are provided two buffer RAM memories 2FA and 2FB, 2EA and 2EB, which receive 8-parallel-bit cell addresses respectively supplied by the counters 3FA and 3FB, 3EA and 3EB. The memories 2FA and 2FB, 2EA and 2EB have data inputs respectively connected to the parallel incoming channels CEF1 to CEF8, CEE1 to CEE8, and have data outputs connected to NS=8 data inputs of a multiplexer 4F, 4E.

The two memories in each memorizing circuit alternately write and read every other frame period. In this way, during a first frame period PTA=500 μs, nbF=80 serialized bits of each of the channels CEF1 to CEF8 and nbE=1024 serialized bits of each of the channels CEE1 to CEE8 are respectively written in the memories 2FA and 2EA at frequencies of 160 kHz and 2.048 MHz, while already written bits in equivalent numbers are respectively read in the memories 2FB and 2EB at frequencies of 4.096 MHz and 49.152 MHz. Reciprocally, during a second frame period PTB=500 μs following the first frame period PTA, the nbF written bits from each of the channels CEF1 to CEF8 and the nbE written bits from each of the channels CEE1 to CEE8 are read in the memories 2FA and 2EA at frequencies of 4.096 MHz and 49.152 MHz respectively, while other bits are written in the memories 2FB and 2EB at frequencies of 160 kHz and 2.048 MHz respectively. Thus, at each input of the multiplexer 4F, 4E and during a frame period, a group of nbF, nbE serialized bits of the respective channel packed into a sector duration DS is repeated at least NS=8 times which enables this group of bits to be dynamically introduced into any frame sector via the multiplexer 4F, 4E.

For these write and read operations, a counter 3FA, 3FB, 3EA, 3EB is reset when the associated memory 2FA, 2FB, 2EA, 2EB is write enabled, and at the start and end of each sector when the associated memory is read enabled. In this instance, the filling bits are then a copy of the first bits in a memorized group. The write and read controls, the write clocks at 160 kHz and 2,048 MHz and the read clocks at 4.096 MHz and 49.152 MHz are supplied by the time base BT. The counters 3FA and 3FB derive 7-bit addresses and can be modulo-nbF counters, the counters 3EA and 3FA derive 11-bit addresses and can be modulo-nbE counters.

The multiplexers 4F and 4E respectively receive eight 4-bit incoming channel addresses at the start of the sectors S1 to S8 of the frame to be formed. The channel addresses are successively read in a RAM memory 5 which is addressed by a 3-bit sector counter 6 at sector frequency 1/DS=42.66 kHz during the frame duration DT and after the duration of the management sector DG at the start of the frame. Beforehand, when communication is being established, the management unit UG write the addresses of the channels corresponding to available sectors in the frame. In this manner, a channel address applied to the multiplexers 4F and 4E by the memory 5 comprises three bits that select a channel from among the eight channels with a same rate, and one bit that selects one of the two multiplexers and consequently the channel rate.

Given that the 96-bit groups and the 1152-bit groups are repeated at least eight times at input of the multiplexers and at the frequency of the sectors, the eight channel addresses read in the memory 5 during a frame period select eight of the sixteen channels so as to time-division multiplex the eight groups of bits from the selected channels into eight frame sectors S1 to S8 at the outputs of the multiplexers 4F and 4E which are connected to a two-input logic OR circuit 7. The groups thus multiplexed and having different one-line rates are applied to an input of an encrypting circuit 8 in the transmitting circuit CT.

According to a preferred embodiment, the encrypting circuit 8 carries out bit by bit encryption of the eight multiplexed frame sectors dependent on the data sectors S1 to S8 in the frame TTC received by the receiving and demultiplexing means in the central station.

For instance, the encrypting circuit 8 comprises an exclusive-OR gate with a first input connected to the output of the OR circuit 7 and receiving the outgoing sectors of the frame TCT to be transmitted and a second input to which are applied the incoming frame sectors received in synchronism with the frame sectors to be transmitted by a data output of a buffer RAM memory 9. A data input of the memory 9 receives the received frame TTC from the receiving means of the central station. A write/read counter 10 writes the bits of the frame received in the memory 9 during the time intervals at which are received the sectors of the received frame TTC located at the end of the frame period PT as per FIG. 1. Then, at the start of the next frame period, the counter 10 read-addresses the bits of the received frame during the time intervals corresponding to the sectors of the frame TCT to be transmitted. The writing and reading of the bits in the memory 10 are controlled by the 49,152 MHz clock signal.

The frame sectors thus encrypted in the circuit 8 are analyzed in a transmission quality circuit 11 which essentially consists in supplying a parity bit for each of the sectors S1 to S8 which is introduced in a predetermined location at the end of the sector, i.e., in the location of one of the 16 or 128 last filling bits of the 4,096-Mbit/s or 49,152-Mbit/s sector. The circuit 11 further comprises conventionally a bistable latch of which the complementary output is loop-linked to the data input and which is similar to a divide-by-two frequency divider.

The management sector SG bits are introduced by the management unit UG during the 7.81-μs time interval at the beginning of the frame via an input of an inserting circuit 12, equivalent to an OR gate, having another input connected to the output of the circuit 11.

The frame TCT thus constituted is transmitted in the transmission medium SUT servicing the terminal stations via a conventional transmitting circuit 13. For instance, when the transmission medium is an optical fiber forming the trunk of a tree-structured optical network connected to the terminal stations, the circuit 13 comprises a photoelectric emitter of the LED or laser diode type, with its amplifying and biasing circuit.

Again in reference to FIG. 1, the multirate frame TTC constituted by the terminal stations via the transmission medium and received by the central station SUT has a duration DT and also comprises a management sector SG and eight data sectors S1 to S8, like the frame TCT. At central station level, the frame TTC is received at the end of the period PT in the last 195.31 ps.

Figure 3:
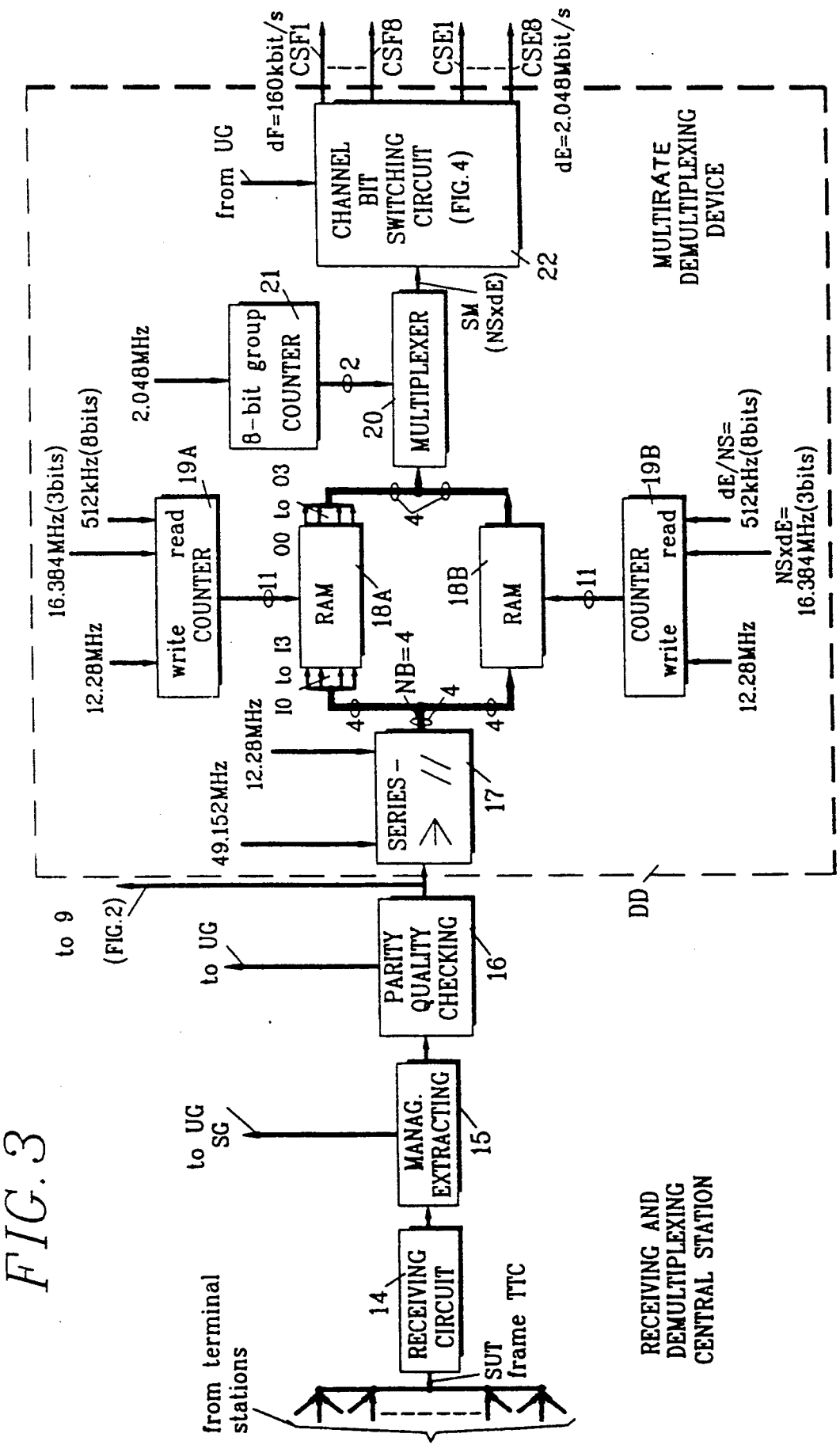
FIG. 3 is a schematic block diagram of multirate receiving and demultiplexing means included in the central station.

As shown in FIG. 3, the receiving and demultiplexing means in the central station comprise receiving means performing reciprocal operations of those performed by the transmitting means. A receiving circuit 14 receives the frames TTC supplied together by the terminal stations. The circuit 14 comprises e.g. a photodetector of the PIN photodiode type when the medium SUT is comprised of optical fibers. The digital frames TTC then cross a management bits extracting circuit 15 and a quality checking circuit 16.

The circuit 15 extracts from each frame TTC the various words comprising the management sector SG which are processed by the management unit UG. The management sector SG in the frame TTC does not comprise an alignment word, and all the protocol words exchanged between one of the terminal stations and the central station have a variable location in the sector SG which depends on the distance from the terminal station to the central station.

In particular, the circuit 16 checks the parity of each of the sectors S1 to S8 of the frame, by comparing the parity bits received at the end of the sectors S1 to S8 with the parities calculated from the sectors of the received frame, and signals all anomalies arising out of this checking to the management unit UG.

The received multirate frame TTC thus rid of the management and parity bits and essentially comprising the data bits in the sectors S1 to S8 is applied in series to the memory 9 (FIG. 2) of the transmitting means and to the input of a series-to-parallel converter 17.

In a demultiplexing device DD of the central station embodying the invention are included, in addition to the converter 17, two buffer memories 18A and 18B associated with address counters 19A and 19B, a 4-bit multiplexer 20 associated with an 8-multiplexed-bit group counter 21, and a channel bit switching circuit 22. The purpose of the circuits 17 to 21 is to constitute a multiplex signal SM in which the data bits included in the sectors S1 to S8 of the received frame TTC are multiplexed bit by bit at a frequency of $(1024 \times 8)/500 = 16,384$ MHz during a frame period PT=500 µs, considering each of the NS=8 sectors as comprising a group of 1024 useful bits since NS×dE=16.384 MHz, irrespective of the on-line rate of the sector. The bits of the sectors are then naturally switched at this frequency to the outgoing channels selected by the switching circuit 22.

(r,s) hereinafter designates a useful bit of rank r in the $s^{th}$ sector of the received frame TTC, where the integral index r varies from 1 to nbE=1024 and the integral index s varies from 1 to NS=8.

The converter 17 receives the sector bits at the high frequency of DE=49.152 MHz and transmits them in the form of groups of NB=4 parallel bits at a frequency of 49,152/4=12.288 MHz to NB data inputs I0 to I3 of the RAM memories 18A and 18B. In a more general manner, the number of bits NB in a group may be a sub-multiple of the number of channel sectors NS in a frame, i.e., equal to 8 or 4 or 2.

The memories 18A and 18B, like the two memories in each of the memorizing circuits 1F and 1E (FIG. 2), alternately perform write and read functions. During a given frame period PT=500 µs, one 18A of the memories memorizes a given frame received in successive groups of NS=4 parallel bits at a frequency of DE/NS; then during the following frame period, the bits written in the memory 18A are read in a predetermined order in groups of NB=4 bits at the multiplex signal SM frequency NS×dE=16.384 MHz. During these two successive frame periods, the other memory 18B respectively reads and writes in order to retransmit a received frame that precedes said given frame and to memorize a received frame that follows the given frame.

To do so, an address counter 19A, 19B supplies 11-bit addresses at different rates in write and read operations.

In the write operation, the counter 19A, 19B is activated at the start of the first sector S1 after 7.81 Hs following the start of the frame TTC. The counter 19A, 19B supplies write addresses 0 to 255 in order to write the nbE/NB=256 groups of 4 parallel bits from sector S1 when the latter has an on-line rate equal to 49.152 Mbit/s, or in order to write the nbF bits of the sector S1 when the latter has an on-line rate equal to 4.096 Mbit/s, each of these bits being in fact successively written in the form of 3=(DE/DF)/NB groups of NB=4 identical bits in the memory at a frequency of 12.288 MHz. The counter 19A, 19B is then stopped during reception of the 128/4=32 groups of filling bits for a sector S1 with an on-line rate equal to 49,152 Mbit/s, corresponding to 16/4=4 groups of filling bits for a sector S1 with an on-line rate equal to 4,096 Mbit/s. The write addresses are timed at a frequency of 12.288 MHz. Likewise, the counter 19A, 19B supplies write addresses 256 to 511 . . . 1792 to 2043 during reception of the useful data bits in the sectors S2 to S8. The respective memory 18A, 18B thus memorizes the following useful bits applied to the inputs I0 to I3, the filling bits in the sectors not being written in the memory:

I0=(1,1).(5,1) . . . (1021,1).(1,2) . . . . . . (1021,8);

I1=(2,1).(6,1) . . . (1022,1).(2,2) . . . . . . (1022,8);

I2=(3,1).(7,1) . . . (1023,1).(3,2) . . . . . . (1023,8);

I3=(4,1).(8,1) . . . (1024,1).(4,2) . . . . . . (1024,8).

In the read operation, the counter 19A, 19B also supplies 11-bit read addresses. Each read address in relation to a group of NB=4 bits is divided into a first part comprising the three most significant bits and a second part comprising the eight less significant bits of the address. The three stages of the counter corresponding to the first part of the address then operate as a modulo-8 counter at a frequency of (NS×dE)=16,384 MHz, while the states of the eight other stages of the counter are unchanged during four consecutive cycles of the modulo-8 counter so as to successively read NB=4 identical sets each having NS=8 groups of NB=4 parallel bits, the bits in these groups being located at NB=4 same ranks in the NS=8 written sectors. Under these conditions, each output of the corresponding memory 18A, 18B repeats a same series of NS=8 bits NB=4 times, these eight bits initially having an identical rank in the sectors. The eight other stages of the counter 19A, 19B correspond to the second part of the read address operating as a modulo-(nbE/NB)-=modulo-256 counter at a frequency of (NS×dE)/(NS×NB)=16384/(8×4)=512 kHz in order to successively read the sets of eight 4-bit groups.

According to this read operation, the outputs O0 to O3 of the corresponding memory 18A, 18B respectively supply the following bits to the NB=4 inputs of the multiplexer 20 during a frame period PT:

O0 =

(1,1).(1,2).(1,3).(1,4). . .(1,8).(1,1). . .(1,8).(1,1). . .(1,8).(1,1). . .

(1,8).(5,1).(5,2).(5,3).(5,4). . .(5,8).(5,1). . .(5,8).(5,1). . .(5,8).

(5,1). . .(5,8). . . . . .(1021,1).(1021,2).(1021,3).(1021,4). . .(1021,8).

(1021,1). . .(1021,8).(1021,1). . .(1021,8).(1021,1). . .(1021,8);

O1 =

(2,1).(2,2).(2,3).(2,4). . .(2,8).(2,1). . .(2,8).(2,1). . .(2,8).(2,1). . .

(2,8).(6,1).(6,2).(6,3).(6,4). . .(6,8).(6,1). . .(6,8).(6,1). . .(6,8).

(6,1). . .(6,8). . . . . .(1022,1).(1022,2).(1022,3).(1022,4). . .(1022,8).

(1022,1). . .(1022,8).(1022,1). . .(1022,8).(1022,1). . .(1022,8);

O2 =

(3,1).(3,2).(3,3).(3,4). . .(3,8).(3,1). . .(3,8).(3,1). . .(3,8).(3,1). . .

(3,8).(7,1).(7,2).(7,3).(7,4). . .(7,8).(7,1). . .(7,8).(7,1). . .(7,8).

(7,1). . .(7,8). . . . . .(1023,1).(1023,2).(1023,3).(1023,4). . .(1023,8).

(1023,1). . .(1023,8).(1023,1). . .(1023,8).(1023,1). . .(1023,8);

O3 =

(4,1).(4,2).(4,3).(4,4). . .(4,8).(4,1). . .(4,8).(4,1). . .(4,8).(4,1). . .

(4,8).(8,1).(8,2).(8,3).(8,4). . .(8,8).(8,1). . .(8,8).(8,1). . .(8,8).

(8,1). . .(8,8). . . . . .(1024,1).(1024,2).(1024,3).(1024,4). . .(1024,8).

(1024,1). . .(1024,8).(1024,1). . .(1024,8).(1024,1). . .(1024,8).

Two selection inputs of the multiplexer 20 are connected to the two stages of the counter 21 which receives a clock signal at dE=16,384/8=2,048 MHz. The counter 21 selects four groups each having 8 bits of the sectors multiplexed and serialized during a period of PT/(nbE/NB)=1/(512 kHz) corresponding to the NB=4 consecutive cycles of the 8-bit second part of the counter 19A, 19B. The counter 21 thus cyclically selects the four outputs of a memory 18A, 18B, and only eight bits at each of these outputs are retransmitted in the multiplex signal SM during a cycle of the counter 21. As a group of eight bits is repeated 4 times at an output of the memory 19A, 19B, the first 8-bit group at the output O0 is selected, then the second 8-bit group at the output O1, and so on. Though only one 8-bit group is selected at each output O0 to O4 at a frequency of 512 kHz, the bits of the group are always transmitted at a frequency of NS×dE=16,384 MHz. The multiplex signal SM is comprised of the following bits during a complete frame period PT:

SM =

(1,1).(1,2).(1,3).(1,4)...(1,8).(2,1)...(2,8).(3,1)...(3,8).(4,1)...

(4,8).(5,1).(5,2).(5,3).(5,4)...(5,8).(6,1)...(6,8).(7,1)...(7,8).

(8,1)...(8,8)......(1021,1).(1021,2).(1021,3).(1021,4)...(1021,8).

(1022,1)...(1022,8).(1023,1)...(1023,8).(1024,1)...(1024,8).

It is recalled that the bits of an on-line sector having an on-line rate less than the maximum rate DE are successively repeated in proportion to the ratio of the maximum rate over the on-line rate; e.g. for the on-line rate DF=4.096 Mbit/s, a bit is repeated 49,152/4,096=12 times; and if the sector Ss corresponds to this low rate, for instance the bits (1,s) to (12,s) represent the first bit of the sector Ss and have a binary state identical to the state of the first bit of the sector Ss.

Figure 4:
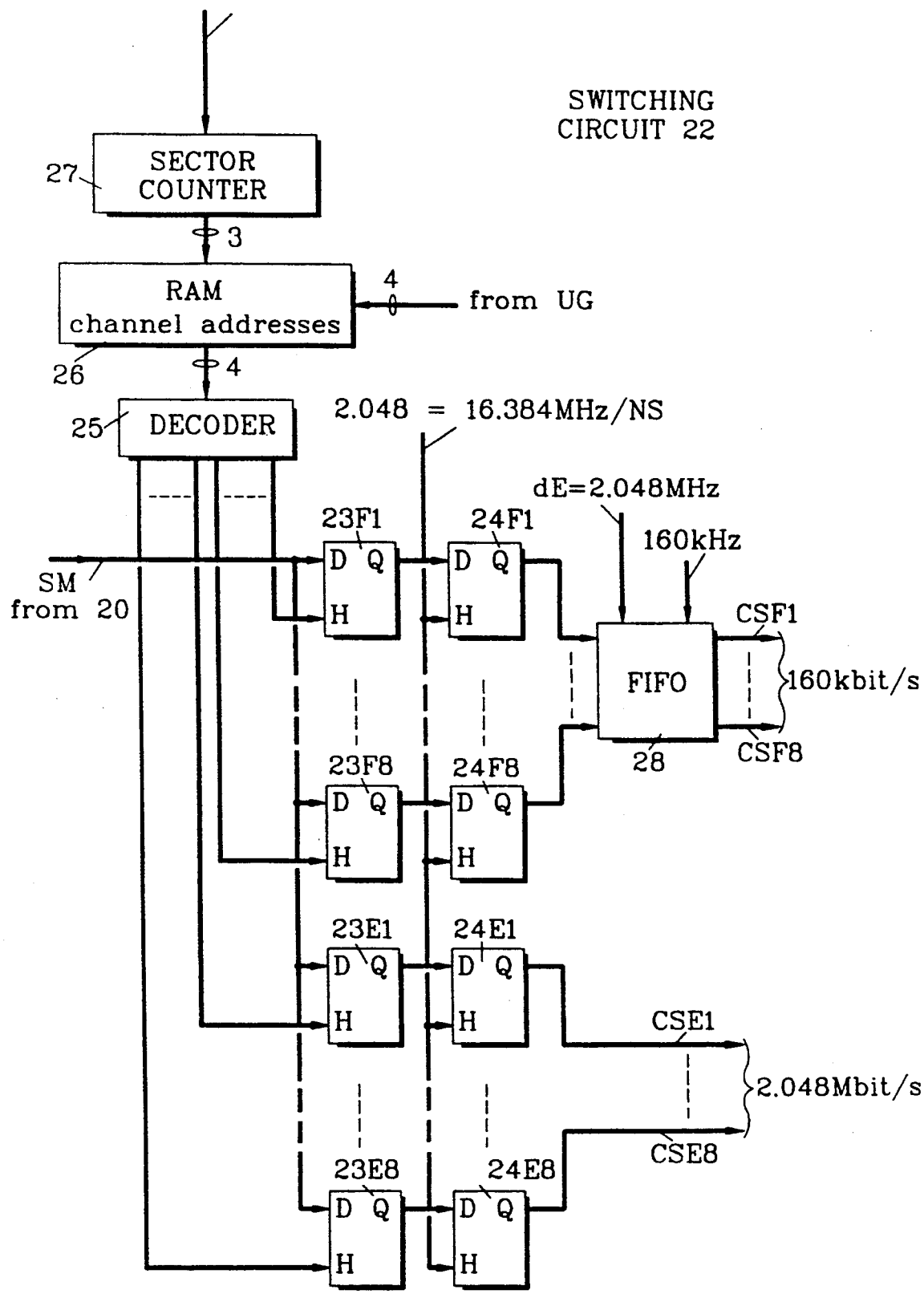
FIG. 4 shows details of a channel bit switching circuit included in the receiving and demultiplexing means.

As shown in FIG. 4, the switching circuit 22 comprises pairs of bistable flip-flops 23F1–24F1 to 23F8–24F8 respectively servicing the outgoing digital channels CSF1 to CSF8 at low rate, and pairs of bistable flip-flops 3E1–24E1 to 23E8–24E8 respectively servicing the outgoing digital channels CSE1 to CSE2 at high rate. Data inputs D of the first flip-flops 23F1 to 23F8 and 23E1 to 23E8 are connected to the output of the multiplexer 20. Outputs Q of the first flip-flops are respectively connected to the data inputs of the second flip-flops 24F1 to 24F8 and 24E1 to 24E8.

Clock inputs H of the first flip-flops 23F1 to 23F8 and 23E1 to 23E8 are respectively connected to sixteen outputs of a 4-bit decoder 25. The decoder decodes a 4-bit channel address into a strobe in the high logic state "1" at the corresponding output. As in the multiplexing device DM, the channel addresses are read in a RAM memory 26 under the control of a sector counter 27. The counter 27 supplies sector addresses 0 to 8 at the frequency of NS×dE=16.384 MHz in such a way as to have the corresponding respective channel correspond with each sector of the received frame TTC. The writing of the channel addresses in the memory 26 is carried out by the management unit UG when communication is being established.

In this way, to each sector address supplied by the counter 27 at the same frequency as the bits of the multiplex signal SM corresponds a first flip-flop 23F1 to 23E8 of which the input H receives a clock strobe. The corresponding channel bit in the signal SM is thus applied to the second corresponding flip-flop 24F1 to 24E8 and is read at a frequency of dE=16,384/NS=2,048 MHz which is applied to the clock inputs H of the second flip-flops.

The outputs Q of the second flip-flops 24E1 to 24E8 are directly connected to the high-rate outgoing channels CSE1 to CSE8.

The outputs Q of the second flip-flops 24F1 to 24F8 are connected to the low-rate outgoing channels CSF1 to CSF8 via a FIFO buffer queue 28 in which 8-parallel-bit words leaving the flip-flops are written at a frequency of 2,048 MHz and are read at the binary frequency of the channels equal to 160 kHz.

Receiving and transmitting means in a terminal station matched to an on-line rate of DE=49.152 Mbit/s are now described in reference to FIGS. 5 and 6.

The terminal station comprises a time base BTT which recuperates the 49.152-MHz master clock signal from the multirate signal transmitted by the multiplexing and transmitting means in the central station via the transmission medium SUT. The time base BTT supplies all the clock signals required by the receiving and transmitting means to extract the respective sector of the received frame TCT, and to insert the management sector SG when the terminal station exchanges protocol words with the central station and the sector attributed to the terminal station in the frame TTC. For instance, S8 designates the sector attributed to the terminal station described above.

A management unit UGT is also included in the terminal station notably to process the protocol words exchanged with the central station and to monitor the quality of transmission.

As shown in FIG. 5, the receiving means successively comprise, from the transmission medium SUT, a receiving circuit 29, a sector extracting circuit 30, an attributed sector parity checking circuit 31, a series-to-parallel converter 32, a decrypting circuit 33, a FIFO type buffer memory 34, and a parallel-to-series converter 35 retransmitting the incoming channel data bits CEE at the primary rate of 2.048 Mbit/s attributed to the terminal station.

The functions of the circuits 29, 30 and 31 are similar to those of the circuits 14, 15 and 16 in the central station (FIG. 3). In particular, the extracting circuit 30 extracts the management sector SG and the attributed sector S8 from the frame TCT in order to deliver them to the management unit UGT and to the parity checking circuit 31 respectively. In the digital signal regenerated by the receiving circuit 29, the circuit 31 checks the parity of the attributed sector S8 in the received frames TCT, in conjunction with the management unit UGT.

The converter 32 receives the bits of the attributed sector S8 at a frequency of 49.152 MHz. It converts only the nbE (or nbF) useful bits received from said sector into 8-parallel-bit words at a frequency of 6.144 MHz. In the circuit 33, the 8-bit words are decrypted by 8-bit words having the same rank in the sector of the frame TTC which was memorized in the terminal station and received by the central station during the previous frame period. The decryption is carried out by eight exclusive-OR gates, commensurate with the encryption in the circuit 8 of the central station.

The decrypted 8-parallel-bit words from the attributed sector leaving the circuit 33 are written in the memory 34 at a frequency of 6.144 MHz and are continually read at a frequency of 2048/8=256 kHz. The converter 35 converts the 8-parallel-bit words at a frequency of 256 kHz into the serialized bits of the corresponding digital channel CEE at a frequency of 256×8=2048 kHz.

The transmitting means in the terminal station shown in FIG. 6 comprise from input of the corresponding digital channel CSE at 2,048 Mbit/s, a transmission quality circuit 36 and a series-to-parallel converter 37. The circuit 36 computes a parity bit BP for each frame period PT=500 Ms for every nbE=1024 bits of the channel CSE. The converter 37 converts the serialized bits at 2.048 MHz leaving the circuit 36 into 8-parallel-bit words at a frequency of 256 kHz.

Each 8-parallel-bit word produced by the converter 37 is written in two FIFO buffer memories 38 and 39 at a frequency of 2048/8=256 kHz and are read at a frequency of 8-bit words in the on-line sector, i.e., equal to 49.152/8=6.144 MHz. However, the readings in these two memories, which both take place during the frame period following the writing of these same words, are independent of one another.

In the first memory 38, the reading is enabled during the reception of the attributed sector S8 in the frame TCT received by the terminal station, i.e., after (DG+7 DS) μs from the start MVT of the frame TCT. The 8-bit words read are applied to second inputs of the eight exclusive-OR gates included in the decrypting circuit 33 so as to decrypt the 8-bit words of the received sector S8 applied by the converter 32.

In the second memory 39, the reading is enabled as a function of the propagation time between the terminal station and the central station indicated to the management unit UGT by the central station, i.e., during the strobe corresponding to the attributed sector S8 in the frame TTC in order for the words that have been read to arrive during the last DS=23.44 Ms of the frame period PT in the central station.

The transmitting means in the terminal station also comprise, from the buffer memory 39, a sector bit multiplexer 40, a parallel-to-series converter 41, a management sector inserting circuit 42 and a transmitting circuit 43.

During the duration DS of the attributed sector, the multiplexer 40 receives the words of useful bits read in the memory 39 by an 8-wire bus, as well as control and check bits supplied by the management unit UGT and the quality circuit 36 via a bus with about ten wires, numbering less than NBE-nbE. The selection of the buses in the multiplexer 40, controlled by the time base BTT, also enables the filling bits to be supplied at the end of the sector, these bits being typically copies of the last useful bits.

The 8-bit words supplied at a frequency of 6,144 MHz by the multiplexer 40 are serialized by the converter 41 into a sector of NBE=1152 bits at an on-line rate of 8×6.144=49.152 Mbit/s.

The serialized bits of the attributed sector S8 go through the inserting circuit 42, equivalent to an OR gate, of which the other input receives, should the case arise, frame TTC management sector SG bits, 8 DS ds beforehand and at the frequency DF. The inserting circuit 42 also introduces bits at predetermined locations to enable the central station to evaluate the propagation time between the latter and the terminal station.

Finally, the transmitting circuit 43 transmits the attributed sector S8, possibly preceded by management bits, in the medium SUT for it to be mixed there with sectors from other active terminal stations, at the level of couplers of the tree network so as to constitute a return frame TTC.

For a terminal station associated with an on-line rate lower than the rate DE, e.g. associated with the rate of DF=4,096 Mbit/s, the receiving and transmitting means are similar to those described above and illustrated in FIGS. 5 and 6. In this case, the 49.152 MHz, 6,144 MHz, 256 kHz and 2,048 MHz frequencies are replaced by frequencies of 4,096 MHz, 512 kHz, 20 kHz and 160 kHz.

However, according to a less complex embodiment, for such a low rate the converters 32, 35, 37 and 41 can be suppressed. The processing of the bits in the terminal station is performed in series by means of three FIFOs at frequencies of 4.096 MHz and 160 kHz. The FIFO in the receiving means is instead of the converter 32. The multiplexer 40 is suppressed in the transmitting means and replaced by equivalent serialized functions in the inserting circuit 42.

The present invention is applicable when the transmission between the central station and the terminal stations is two-way (duplex) via a tree-structured transmission medium SUT, e.g. a conventional coaxial cable medium, the circuits 13-14 and the circuits 29-43 can be modems, or a medium SUT with two optical fibers. In this instance, the duration of a frame DT is practically equal to the duration of a frame period PT.

According to another application of the invention, the communication network is a half-duplex network and only comprises one tree-structured coaxial cable or optical fiber. In this instance, the forward frames TCT, also referred to as descending frames, and the return frames TTC, also referred to as ascending frames, are alternately exchanged between the central station and the terminal stations, each during a half-period of frame. In this manner, as clearly shown in FIG. 1, the central station transmits a frame TCT at the start of a period PT and receives a frame TTC at the end of the frame period PT. Such a transmission mode is more precisely designated by "collective half-duplex and time-division multiple access mode" (TDMA).

A duration of TP=PT−2 DT=109,375 μs is provided between the two frames TCT and TTC. The duration TP enables the terminal station furthest from the central station to receive the frame TCT and, after a short standby time, to transmit at least its attributed sector in the corresponding time interval of the frame TTC.

What I claim is:

1. A method for multiplexing a plurality of parallel digital channels having different primary channel rates (dF, dE), respectively, into a digital frame having a predetermined frame duration (DT) and a predetermined frame period (PT), comprising the steps of:
   (a) forming a digital frame (TCT) including a plurality of sectors (S1–S8) each having a predetermined sector duration (DS); and
   (b) allocating said sectors to said digital channels, respectively, at least some of said sectors (S2, S8) having different on-line sector rates (DF, DE) that are higher than the primary channel rates (dF, dE) of the associated digital channels, respectively, said different on-line sector rates being submultiples of the highest one of said sector on-line rates, whereby said sectors coincide with integer numbers of bits of said digital channels, respectively, irrespective of said on-line sector rates of said sectors.

2. The method of claim 1, wherein said frame duration is shorter than said frame period.

3. The method of claim 2, wherein said frame duration is shorter than a half-period of said frame.

4. A method for multiplexing a plurality of parallel digital channels of bits at least some of which channels have different primary channel rates, respectively, said channels being multiplexed into a digital frame (TCT)

having a plurality of sectors (S1–S8), said frame having a predetermined frame duration (DT) and a predetermined frame period (PT), said sectors being allocated to said digital channels, respectively, and having a predetermined sector duration (DS), at least some of said sectors having different on-line sector rates (DF, DE) that are submultiples of the highest sector on-line rate and that are higher than the primary channel rate (dF, dE) of the associated digital channel, respectively, comprising the steps of:

(a) memorizing the bits of said channels during a frame period preceding a given frame into groups of serialized channel bits which are memorized in parallel, respectively;

(b) reading in parallel said groups of channel bits at on-line rates of sectors which are allocated to said channels, respectively, throughout the duration of each of said sectors in a given frame, thereby reading each of said channel bit groups as many times as there are sectors in said frame;

(c) allocating said sectors of said given frame to digital channels from among said plurality of digital channels, respectively; and (d) selecting one by one each of said parallel read groups of bits from each of said channels to which said sectors are allocated, respectively, throughout the duration of each of said sectors, respectively, thereby multiplexing selected groups of bits in said given frame at the rate of one selected group per sector.

5. The method of claim 4, wherein the number of bits in one of said groups memorized in parallel is lower than the number of bits contained in the respective sector, the difference between said numbers corresponding generally with the selected sector bits.

6. The method of claim 4, wherein said given digital frame also includes a heading portion (SG), and further comprising the steps of:

(e) introducing into said heading portion a sector of management bits following the multiplexing of said selected groups of bits.

7. The method of claim 6, wherein said management bit sector has a on-line rate equal to the lowest on-line rate of said channel sectors.

8. Apparatus for multiplexing a plurality of parallel digital channels of bits having different primary rates, respectively, into a digital frame (TCT) having a plurality of sectors (S1–S8), said frame having a predetermined frame duration (DT) and a predetermined frame period (PT), said sectors being allocated to said digital channels, respectively, and having a predetermined sector duration (DS), at least some of said sectors having different on-line sector rates (DF, DE) that are submultiples of the highest sector on-line rate and that are higher than the primary channel rate (dF, dE) of the associated digital channel, respectively, comprising:

(a) a plurality of means for memorizing the bits of said channels, respectively;

(b) a plurality of means for writing in parallel groups of bits of said channels in said memorizing means at said respective primary channel rates during each frame period, respectively;

(c) a plurality of means for reading said channel bit groups in said memorizing means, respectively, at said on-line sector which are allocated to channels which are greater than said primary channel rates throughout the duration of each of said sectors of a frame, respectively, thereby reading each of said channel bit groups as many times as there are sectors in said frame;

(d) means for memorizing the respective addresses of said digital channels from the channels to which said frame sectors are allocated, respectively;

(e) means for successively reading said channel addresses to which said frame sectors are allocated, respectively; and (f) means for multiplexing said channel bit groups in response to said channel addresses and throughout said frame sector duration.

9. The multiplexing device of claim 8, wherein those of said channel bit memorizing means having the same primary channel rate comprise first and second buffer memories, said bits of the channels having a same primary channel rate being written in said first buffer memory at said same periphery channel rate during a given frame period, and parallel groups of bit of said channels being read in said second buffer memory at said on-line sector rates allocated to said channels during all the sectors of the frame included in said given frame period, and conversely during the frame period following said given frame period.

10. A method for multiplexing a plurality of parallel digital channels of bits having different primary channel rates into a digital frame (TCT) having a plurality of sectors (S1–S8), said frame having a predetermined frame duration (DT) and a predetermined frame period (PT), said sectors being allocated to said digital channels, respectively, and having a predetermined sector duration (DS), said sectors having different on-line sector rates (DF, DE) that are submultiples of the highest sector on-line rate and are higher than the primary channel rate of the associated digital channel, respectively, comprising the steps of:

(a) memorizing at said highest on-line sector rate the channel bits included in said frame sectors into memorized channel bits, respectively;

(b) reading groups of said memorized channel bits which are comprised of the memorized channel bits which have respective ranks which are equal in all said sectors, said ranks being defined with respect to the bits in a sector having said higher on-line sector rate, whereby each of said groups comprises bits located at a same rank in said sectors, respectively, said reading of said groups of bits being performed at the highest primary channel rate among said primary channel rates, thereby deriving a multiplex signal where said sectors are multiplexed bit by bit during a frame period; and (c) cyclically switching at said highest primary channel rate the bits of said multiplex signal toward said digital channels to which said sectors are allocated, respectively.

11. The method of claim 10, wherein said frame includes a heading sector (SG) containing management bits, and further including the step of extracting from said heading sector said management bits at an on-line management rate (DG) equal to the lowest on-line sector rate (DF), said extraction step preceding said step of memorizing said channel bits.

12. A demultiplexing device for demultiplexing a plurality of digital channels from a digital frame of sectors, said digital channels having respective primary channel rates which are different, said frame having a predetermined frame duration and a predetermined frame period, and said frame sectors being allocated to said digital channels, respectively, at least some of said sections having on-line sector rates which are different and sub-multiples of the highest said on-line sector rates and which are higher than said primary channel rates, respectively, said device comprising:
- (a) means for converting serialized channel bits in each of said sectors of said frame into successive groups of NB parallel channel bits, where the number of bits NB is a sub-multiple of a number of channel sectors NS in said frame,
- (b) means for memorizing said NB-parallel-bit groups during a frame period,
- (c) means for writing said NB-parallel-bit groups in said memorizing means at a rate which is a submultiple of said highest on-line sector rate in said frame sectors with regard to said bit number NB,
- (d) means for reading said NB-parallel-bit groups in said memorizing means at a rate which is a multiple of said highest primary channel rate with regard to said sector number NS, the reading of said groups being carried out in such a way that NS NB-parallel-bit groups containing bits located at NB same ranks, respectively, in said NS frame sectors are read successively at said multiple rate to form a set of NS groups, said ranks being defined with respect to bits in a sector having said highest on-line sector rate, and each of said NS-group sets is successively read NB times at said highest primary channel rate,
- (e) means for successively selecting NB series each having NS consecutive bits in NB identical sets read successively, a series comprising bits of identical rank in said sectors, and said series being selected by ascending order of the ranks of said bits in said sectors, thereby deriving a multiplex signal where said sectors are multiplexed bit by bit during a frame period, and
- (f) means for switching the bits of said multiplex signal toward said digital channels as a function of a correspondence between addresses of said frame sectors and addresses of said channels.

13. The demultiplexing device of claim 12, wherein said memorizing means comprise first and second buffer memories, groups of NB parallel bit being written in said first buffer memory at said sub-multiple multiple sector rate during the reading-in of said sectors of a given frame and groups of NB parallel bits into said second buffer memory at said multiple rate during said period of said given frame, and conversely during the frame period following said given frame period.

14. The demultiplexing device of claim 12, wherein said reading means derive read addresses of said NB-parallel-bit groups, each of said read addresses comprising a first part and a second part, said first part being representative of the rank of said sectors in the frame and being incremented at said multiple rate and modulo-NS, and said second part being representative of the rank of said NB-bit groups in a sector and being incremented at a sub-multiple rate of said highest primary channel rate with regard to said number of sectors NS.

15. The demultiplexing device of claim 12, wherein said switching means comprise:
- (1) means for memorizing said addresses of said channels to which said frame sectors are allocated, respectively,
- (2) means for cyclically reading at said multiple rate said channel addresses in correspondence with the addresses of said frame sectors to which said channels are allocated, respectively.
- (3) means for demultiplexing each of said series of NS consecutive bits in response to a cycle of sector addresses thereby producing parallel digital channel signals having said highest primary channel rate, and
- (4) a plurality of buffer memories associated with said channels having said primary channel rates and in which said channel signals are written at said highest primary channel rate and read at said primary channel rates of said respective digital channels.

16. A communication network between a central station and a plurality of terminal stations, said central station being connected to a plurality of pairs of parallel incoming and outgoing digital channels having different primary channel rates for two-way servicing said terminal stations, said terminal stations being in communication with said central station via a multirate tree-structured transmission medium and that are matched to different on-line sector rates, respectively, associated with and higher than primary channel rates, said central station including a multiplexing and a demultiplexing device, said multiplexing device being operable to multiplex incoming channels into a first digital frame of sectors to be transmitted from said central station to said terminal stations, said first frame having a predetermined frame duration and a predetermined frame period, and said first-frame sectors being allocated to said incoming channels, respectively, and having a predetermined sector duration and respective on-line sector rates which are different and are submultiples of the highest of said on-line rates and which are respectively higher than said primary channel rates,
- (a) said multiplexing device comprising:
  - (1) a plurality of means for memorizing bits of said incoming channels in parallel, respectively,
  - (2) a plurality of means for writing in parallel groups of bits of said incoming channels respectively in said plurality of memorizing means at said respective primary rates of said channels during each first-frame period,
  - (3) a plurality of means for reading said channel bit groups in said plurality of memorizing means at said respective on-line rates (respectively corresponding to said primary of said incoming channels of said sectors which are allocated to incoming channels throughout the duration of each of said sectors of said first frame thereby reading each of said bit groups as many times as there are sectors in said first frame,
  - (4) means for memorizing respective addresses of said incoming channels to which said first-frame sectors are allocated, respectively;
  - (5) means for reading successively said addresses of the incoming channels during the durations of the respective sectors in said first frame, respectively, and
  - (6) means for multiplexing said bit groups of the channels which are read in response to said addresses of the channels to which said frame sectors are allocated and throughout said first-frame sector durations, there by forming said first frame;
- (b) said demultiplexing device being operable to demultiplex outgoing channels from a second frame of sectors received by said central station via said transmission medium, said second frame having said predetermined frame duration and frame period, and said second-frame sectors having sector duration and on-line sector rates respectively identical to the duration and rates of said first-frame sectors in conjunction with said pairs of incoming and outgoing channels, said demultiplexing device comprising:

(1) means for converting serialized outgoing channel bits in each of said sectors of said second frame into successive groups of NB parallel channel bits, where a number of bits NB is a submultiple of the number of channel sectors NS in said frames, (2) means for memorizing said NB-parallel-bit groups during said frame period, (3) means for writing said NB-parallel-bit groups in said memorizing means at a rate which is submultiple of said highest on-line sector rate in said frame sectors with regard to said bit number NB, (4) means for reading said NB-parallel-bit groups in said memorizing means at a rate which is a multiple of said highest primary channel rate with regard to said sector number NS, the reading of said NB-parallel-bit groups being carried out in such a way that NS NB-parallel-bit groups containing bits located at NB same ranks, respectively, in said NS second-frame sectors are read successively at said multiple rate to form a set of NS groups, said ranks being defined with respect to said bits in a second-frame sector having said highest on-line rate, and each of said NS-group sets is successively read NB times at said highest primary channel rate, (5) means for successively selecting NB series each having NS consecutive bits in NB identical sets read successively, a series comprising bits of identical rank in said second-frame sectors, and said series being selected by ascending order of the ranks of said bits in said second-frame sectors, thereby deriving a multiplex signal where said second-frame sectors are multiplexed bit by bit during said frame period, and (6) means for switching the bits of said multiplex signal toward said digital outgoing channels as a function of a correspondence between addresses of said second-frame sectors and addresses of said outgoing channels.

17. The communication network of claim 16, wherein the number of pairs of incoming and outgoing channels having a same primary rate is at most equal to the number of sectors in each of said frames.

18. The communication network of claim 16, wherein said central station comprises means for memorizing said sectors of each of said second frame received by said demultiplexing device and constituted by said terminal stations, means for reading said memorized second-frame sectors in synchronism with one of said first frames going out from said demultiplexing device, and means for encrypting said sectors of said outgoing first frame by said read sectors of said second frame.

19. The communication network of claim 16, wherein each of said terminal stations operating with one of the primary rates relative to one of said channels comprises means for extracting the respective sector allocated to said one of the channels and at said one of said on-line sector rates from said first frames going out from said central station, means for converting said extracted sector into a group of bits at said one of the primary channel rates of said one of the channels, means for converting groups of bits at said one of the primary channel rates from said respective outgoing channel into one of the second-frame sectors at said one of the on-line sector rates, and means for adding said outgoing channel sectors to said second frames coming into said central station.

* * * * *